J. W. MUELLER.
SHOCK LOADER.
APPLICATION FILED JULY 10, 1908.

910,143.

Patented Jan. 19, 1909.

3 SHEETS—SHEET 1.

FIG. 1

Witnesses
H. C. Stein
L. A. L. McIntyre

Inventor
Jacob W. Mueller by Hopkins & Eicks Attys.

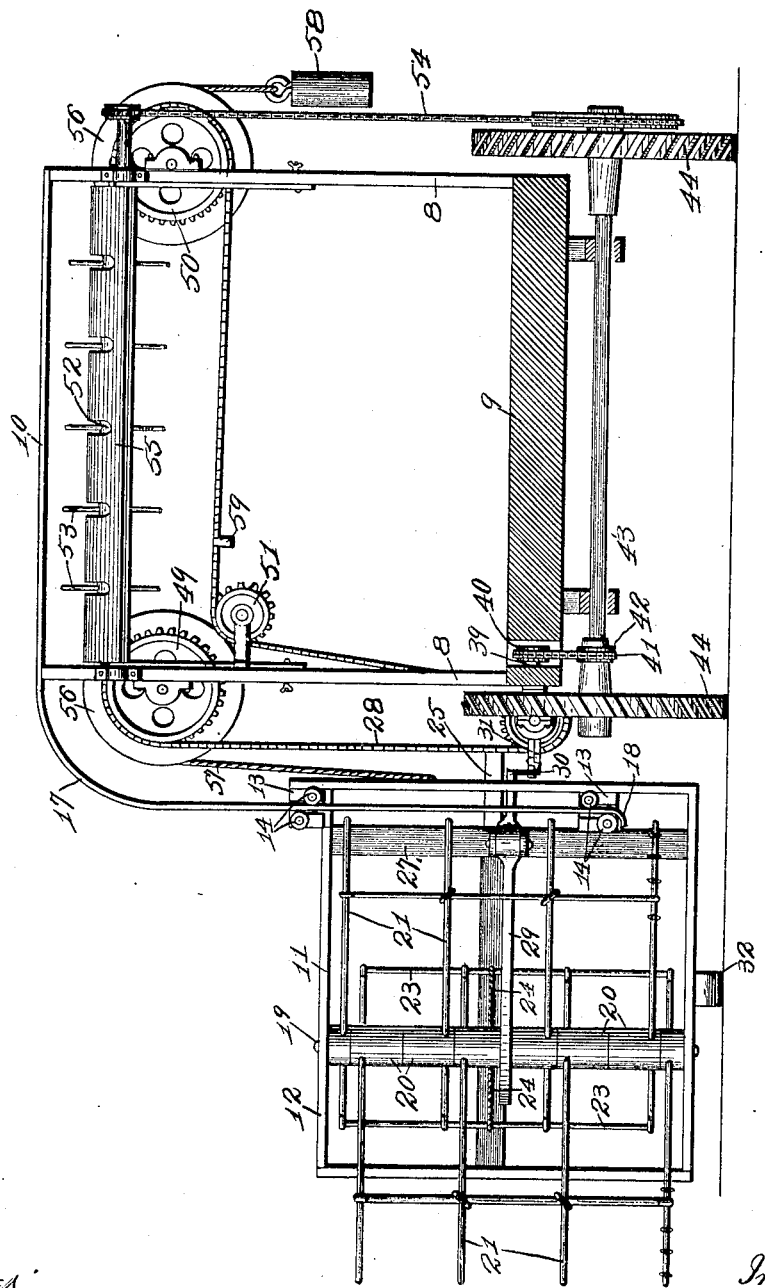

J. W. MUELLER.
SHOCK LOADER.
APPLICATION FILED JULY 10, 1908.
910,143.
Patented Jan. 19, 1909.
3 SHEETS—SHEET 3.
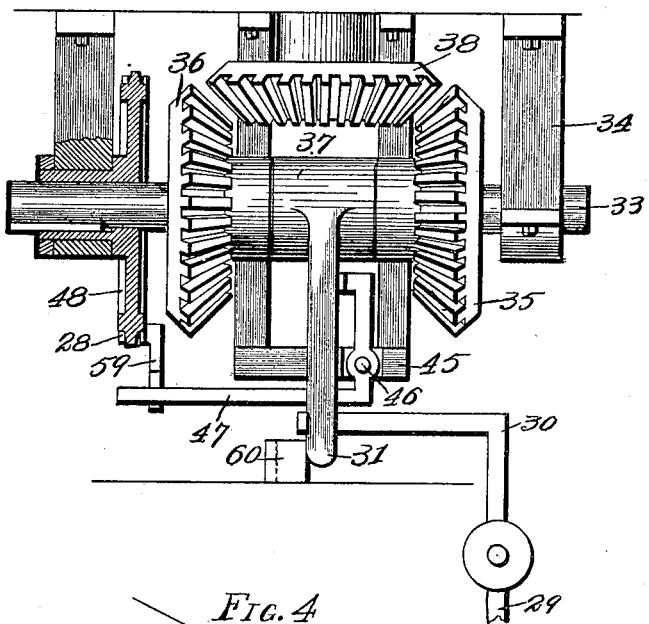
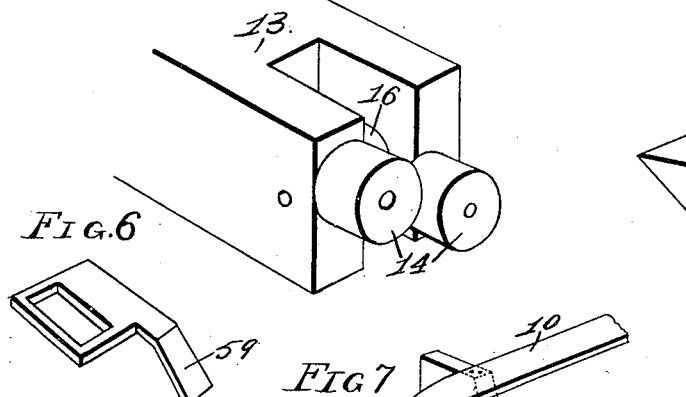
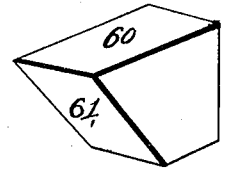
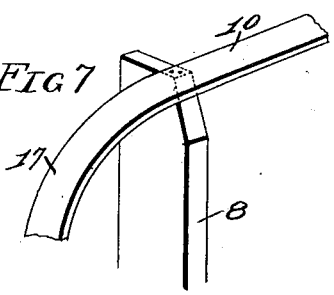
Witnesses
W. C. Stein
L. A. L. McIntyre
Inventor
Jacob W. Mueller
by Hopkins & Eicks Attys

UNITED STATES PATENT OFFICE.

JACOB W. MUELLER, OF MILLSTADT, ILLINOIS.

SHOCK-LOADER.

No. 910,143.  Specification of Letters Patent.  Patented Jan. 19, 1909.

Application filed July 10, 1908. Serial No. 442,986.

*To all whom it may concern:*

Be it known that I, JACOB W. MUELLER, a citizen of the United States, and resident of Millstadt, Illinois, have invented certain new and useful Improvements in Shock-Loaders, of which the following is a specification.

This invention relates to improvements in shock loaders and consists in the novel arrangement, construction and combination of parts as will be fully hereinafter described and claimed.

The object of my invention is to construct a shock loader to be attached to the rear end of a vehicle whereby the shocks of wheat and the like may be picked up during the movement of the vehicle and automatically conveyed into the vehicle.

Figure 1 is a top plan view of my invention showing it in position on the rear end of a vehicle. Fig. 2 is a front view of the same showing a vehicle body in section. Fig. 3 is a detail top plan view of the gear and clutch mechanism by which the shock carrying frame is manipulated. Fig. 4 is a detail perspective view of the rollers and portion of frame by which the shock carrying frame is conveyed on the track. Fig. 5 is a detail perspective view of the inclined dog carried by the frame by which the clutch mechanism is operated. Fig. 6 is a detail perspective view of one of the clutch operating pawls carried by the sprocket chain. Fig. 7 is a detail perspective view of a portion of the rail on which the shock carrier operates and the standard supporting the same.

In the construction of my invention, I provide a pair of standards 8 which are rigidly attached to the body 9 of the vehicle, the said standards extending upwardly at a sufficient height so as not to interfere with the loading of the body and on the upper ends of said standards are rigidly attached guide rails 10 on which the shock frame 11 operates.

The shock frame 11 consists of a rectangular frame 12 supported on horizontal cross bars 13, the ends of said cross-bars provided with rollers 14 which are designed to come in contact with the inner and outer surfaces of the rails 10. The ends of the cross-bars 13 are slotted and in said slots are pivotally mounted rollers 16 which are arranged to contact with the inner edge of the rails 10 so as to prevent binding yet permit the shock frame to freely operate and travel on the rails.

The rails 10 after passing from the standards 8 are bent downwardly, see Fig. 2, and suitably curved at the point indicated by the numeral 17, the bottom ends of said rails bent abruptly as indicated by the numeral 18 forming a stop to limit the downward movement of the shock frame. In the frame 12 is held a shaft 19 and on said shaft is supported a plurality of sleeves 20, each sleeve supporting prongs 21 of suitable material and bent to accommodate the encircling of a shock of wheat or the like; each alternate prong extending in opposite directions. The several prongs forming each frame are rigidly connected together by the rod 23 and to said rod is attached a cable 24 by which said prongs are operated when drawn up so as to encircle the shock and retain the same between the prongs. The opposite end of the cable 24 is attached to an arm 25 which is pivotally mounted at the point indicated by the numeral 26 to an upright 27 forming part of the frame, the opposite end being attached to the sprocket chain 28.

On the frame 12 and centrally located is a curved pivoted arm 29 which extends outwardly and between the prongs 21 so as to come in contact with the shock and manipulate the clutch mechanism hereinafter described by means of the projecting arm 30 forming part of said lever coming in contact with the clutch arm 31.

The bottom of the frame 12 is provided with a shoe 32 constructed of some resilient material, said shoe supporting the frame above the ground and preventing said frame from contacting with projections and to keep the lowest series of prongs a suitable distance above the bottom of the shock so that said prongs have freedom to operate.

The clutch operating mechanism consists of a short shaft 33 supported in bearings 34 which are attached to the side of the vehicle body and on said shaft is mounted a sleeve on which is mounted bevel gears 35 and 36. Intermediate of said gears and upon said sleeve is loosely mounted a sleeve 37 to which is attached the clutch operating arm 31. The sleeve on which the bevel gears 35 and 36 are located, is keyed upon the shaft 33 in such a manner as to permit the same together with the bevel gears to slide thereon so that said gears may be brought in mesh with the bevel gear 38 mounted on a shaft 39 supported in the vehicle frame; this shaft having a sprocket wheel 40 to which power is imparted by the sprocket chain 41 contacting with a sprocket wheel 42 supported on a vehicle axle 43 and is revolved by the traction wheels 44 of the vehicle.

Projecting from the vehicle frame and beneath the bevel gears, I provide the bracket 45 on which is pivotally mounted at the point indicated by the numeral 46 a clutch operating lever 47, the purpose of which will be hereinafter described.

On the short shaft 33 and to one side of the bevel gear 36 is keyed a sprocket wheel 48 by which the sprocket chain 28 is placed in operation, said sprocket chain being of an endless type and is passed over sprocket wheels 49, 50 and 51 supported by the uprights 8, and in such a position as to permit the shock frame to ride upon the track 10 which movement is imparted by the endless sprocket chain 28.

On the standards 8 and in front of the rails 10 is pivotally mounted a shaft 52 which is provided with a plurality of projecting arms 53 suitably bent, and said shaft is placed in revolution by the sprocket chain 54 operated from the traction wheels 44. The object of this shaft is to contact with the shock after it has been released from the prongs of the shock frame and cast the shock from the table 55 on which it is permitted to fall and deliver said shock into the vehicle body. Upon the shafts supporting the sprocket wheels 49 and 50, I provide sheave wheels 56 over which is passed a cable 57, its one end attached to the shock frame, the opposite end provided with a counterbalance weight 58. The purpose of this is to counterbalance the weight of the frame together with the shock when the same is being raised from its lowest vertical position to its highest horizontal position.

The sprocket chain 28 is provided with a pawl 59 and is so arranged as to come in contact with the clutch operating arm 47 at a proper period, manipulating the operating clutch, reversing the operating mechanism.

The clutch frame is also provided with a dog 60 having an inclined surface 61 which is so placed and arranged as to contact with the end of the clutch arm 31 when the frame has reached its lowest point, placing both bevel gears 35 and 36 out of mesh with the bevel gear 38, permitting the frame to remain idle until it has been brought in contact with another shock.

The operation of my invention is as follows: My device, comprising a shock elevating mechanism, can be attached to the rear end of a vehicle; the shock carrying frame being placed in the position as shown in Fig. 2 and as the vehicle is being propelled forwardly, the shock first coming in contact with the arm 29 manipulating the clutch throwing the bevel gear 36 in mesh with the bevel gear 38 which is at all times in operation. At this period the chain 28 is being operated and by means of said chain being attached to the end of the pivoted arm 25, the cable 24 is drawn up which in turn closes the prongs permitting them to encircle the shock. When sufficient tension has been brought upon the shock and by means of the continuous operation of the chain 28, the frame 12 together with the shock is conveyed upwardly bringing the shock in a horizontal position on the rails 10 and when the frame together with the shock has been elevated on the horizontal sections of the rails, the pawl 59 carried by the chain contacts with the arm 47 thereby placing the clutch mechanism in reversed position, bringing the bevel gear 35 in contact with the bevel gear 38, reversing the movement of the chain 28. At this period of change, the prongs are permitted by means of the weight of the shock to open and the shock is permitted to roll on the table 55 and is cast from said table by the prongs 53 of the shaft 52. The shock frame in this condition, is permitted by the reversed movement of the chain to lower itself and when the shoe 32 contacts with the ground, the tapered dog 60 carried by said frame, contacts with the arm 31 operating the clutch in such a manner as to release both bevel gears 35 and 36 from the bevel gear 38 discontinuing the operation until the next shock has contacted with the arm 29 when the operation as previously described is repeated.

Having fully described my invention, what I claim is:

1. A shock loader comprising a shock supporting frame; rails supported to a vehicle-body; prongs carried by the shock lifting frame for contacting with the shock and supporting the same; a clutch mechanism for operating the shock lifting frame and a means for automatically placing the shock lifting frame in operation by the contacting of the shock, and means for reversing the movement after the shock has been delivered, substantially as specified.

2. A device of the class described, comprising a vehicle-body; rails supported by the vehicle-body; a shock lifting frame mounted upon said rails; moving prongs supported by said frame for grasping the shock and retaining the same therein; an operating mechanism controlled by the movement of the vehicle; a lever placing the operating mechanism in rotation when contacted by the shock; and means for reversing the movement of the operating mechanism when the shock has been delivered from the shock carrying frame and means for delivering the shock from the shock carrying frame into the body of the vehicle, substantially as specified.

3. A device of the class described, comprising a vehicle body; standards supported by the vehicle body; rails mounted on said standards and extending downwardly to one side of the vehicle; a clutch operating mechanism supported by the vehicle-body; an endless chain operated by the clutch operating mechanism; a shock carrying frame mounted upon the rails and operated by the endless chain; moving prongs carried by the frame; a lever connected to the endless chain and prongs; a lever projecting between the prongs and manipulating the clutch operating mechanism when contacting with the shock; a pawl carried by the chain for reversing the movement of the chain when the shock carrier has been raised to its highest point and a dog carried by the frame for distributing the operation of the chain, substantially as specified.

In testimony whereof, I have signed my name to this specification, in presence of two subscribing witnesses.

JACOB W. MUELLER.

Witnesses:
ALFRED A. EICKS,
WALTER C. STEIN.